United States Patent [19]

Binsack et al.

[11] E Patent Number: Re. 33,032

[45] Reissued Date of Patent: Aug. 22, 1989

[54] POLYCARBONATE FILMS OF LOW FLAMMABILITY AND IMPROVED STRESS CRACK RESISTANCE

[75] Inventors: Rudolf Binsack, Krefeld; Joachim Wank; Eckart Reese, both of Dormagen, all of Fed. Rep. of Germany

[73] Assignee: Bayer Aktiengesellschaft, Leverkusen, Fed. Rep. of Germany

[21] Appl. No.: 121,207

[22] Filed: Nov. 16, 1987

Related U.S. Patent Documents

Reissue of:

[64] Patent No.: 4,214,062
Issued: Jul. 22, 1980
Appl. No.: 875,014
Filed: Feb. 3, 1978

[30] Foreign Application Priority Data

Feb. 14, 1977 [DE] Fed. Rep. of Germany ..... 2706126

[51] Int. Cl.[4] ..... C08K 5/42
[52] U.S. Cl. ..... 524/165; 524/611
[58] Field of Search ..... 524/165, 166, 611

[56] References Cited

U.S. PATENT DOCUMENTS

| | | | |
|---|---|---|---|
| 2,964,797 | 12/1960 | Peilstocker et al. | 528/196 |
| 3,365,517 | 1/1968 | Barth | 528/196 |
| 3,475,372 | 10/1969 | Gable | 260/45.75 R |
| 3,535,300 | 10/1970 | Gable | 260/45.7 RL |
| 3,597,394 | 8/1971 | Rawlings | 260/47 XA |
| 3,635,895 | 1/1972 | Kramer | 260/47 XA |
| 3,775,367 | 11/1973 | Nouvertne | 252/609 |
| 3,787,359 | 1/1974 | Horn et al. | 260/47 XA |
| 3,836,490 | 9/1974 | Bockmann et al. | 260/47 XA |
| 3,845,007 | 10/1974 | Nouvertne et al. | 524/165 |
| 3,875,107 | 4/1975 | Nouvertne et al. | 524/165 |
| 3,876,580 | 4/1975 | Nouvertne et al. | 524/165 |
| 3,931,100 | 1/1976 | Mark | 524/164 |
| 3,931,108 | 1/1976 | Binsack et al. | 260/47 XA |
| 4,007,155 | 2/1977 | Mark | 524/165 |
| 4,022,944 | 5/1977 | Bottenbruch et al. | 260/47 XA |
| 4,041,003 | 8/1977 | Adelmann et al. | 260/37 PC |
| 4,043,980 | 8/1977 | Baron et al. | 260/47 XA |
| 4,145,373 | 3/1979 | Baron et al. | 528/196 |
| 4,185,009 | 1/1980 | Idel et al. | 524/165 |

FOREIGN PATENT DOCUMENTS

| | | |
|---|---|---|
| 2149311 | 4/1973 | Fed. Rep. of Germany |
| 1370744 | 10/1974 | United Kingdom |

*Primary Examiner*—Veronica P. Hoke
*Attorney, Agent, or Firm*—Gene Harsh; Joseph C. Gil; Aron Preis

[57] ABSTRACT

The present invention relates to polycarbonate films, and in particular extruded films and cast films, but preferably extruded films, which are characterized in that they contain about 0.01% to 2% by weight of a $NH_4$ salt, alkali metal salt or alkaline earth metal salt of a perhalogenoalkanesulphonic acid, preferably a perfluoroalkanesulphonic acid.

18 Claims, No Drawings

POLYCARBONATE FILMS OF LOW FLAMMABILITY AND IMPROVED STRESS CRACK RESISTANCE

Matter enclosed in heavy brackets [ ] appears in the original patent but forms no part of this reissue specification; matter printed in italics indicates the additions made by reissue.

BACKGROUND OF THE INVENTION

Polycarbonate cast films of low flammability which consist of 90 to 70% by weight of a high-molecular polycarbonate based on bisphenol A and 10 to 30% by weight of a low-molecular polycarbonate based on halogeno bisphenols are known according to DT-OS (German Published Specification) No. 2,345,533 (Le A 15318)resp. British Pat. No. 1458603. The high molecular polycarbonates based on bisphenol A which have $\overline{M}w$, between about 70,000 and 120,000 are particularly suitable in this situation.

It is known to render thermoplastic aromatic polycarbonates more flame-repellent by adding halogenoalkanesulphonates. (See DT-OS (German Published Specification) No. 1,930,257 (Le A 12 278), DT-OS (German Published Specification) No. 2,253,072 (Le A 14723), U.S. Pat. No. 3,775,367, DT-OS (German Published Specification) No. 2,460,944 and DT-OS (German Published Specification) No. 2,460,787 respectively U.S. Pat. No. 3,931,100).

It is also known to add ammonium salts of perfluoroalkanesulphonic acids to thermoplastic aromatic polycarbonates, as mold release agents for the manufacture of polycarbonate injection-molded articles. (See DT-OS (German Published Specification) No. 2,506,726 (Le A 16 235) and U.S. Pat. No. 4,041,003. However, the use of thermoplastic aromatic polycarbonates containing halogenoalkanesulphonates for the manufacture of films, in particular of extruded films, is not known.

SUMMARY OF THE INVENTION

The present invention relates to polycarbonate films, and in particular extruded films and cast films, but preferably extruded films, which are characterized in that they contain about 0.01 to 2% by weight, most preferably about 0.01 to 1% by weight, of a $NH_4$ salt, alkali metal salt or alkaline earth metal salt of a perhalogenoalkanesulphonic acid, preferably a perfluoroalkanesulphonic acid.

DETAILED DESCRIPTION OF THE INVENTION

The polycarbonate films according to the invention possess a combination of good properties, such as fire-retardancy, stress crack resistance, safety from electrolytic contact corrosion and, in the case of extruded films, freedom from solvent.

The polycarbonate films according to the invention can, thus, be preferably employed with great success as electrical insulating films, which must be particularly resistant to stress cracking and to electrolytic contact corrosion.

Films of polycarbonates containing alkali metal sulphonate (DT-OS (German Published Specification) No. 2,149,311), of polycarbonates containing soluble alkali metal salts (U.S. Pat. No. 3,836,490) and of polycarbonates containing glass fibers and alkali metal salts of perfluoroalkanesulphonic acid (DT-OS (German Published Specification) No. 2,148,598 and U.S. Pat. Nos. 3,845,007; 3,876,580 and 3,875,107) are now indeed known, but it was surprising that the content according to the invention of perhalogenoalkanesulphonates, in particular of perfluoroalkanesulphonates, in polycarbonate films, besides reducing the flammability does not increase the electrolytic conductivity and thus causes no contact corrosion when the films are employed as electrical insulating films. It was particularly surprising that the stress crack resistance is improved in polycarbonate films by the addition, according to the invention, of perhalogenosulphonates.

$NH_4$, alkali metal and alkaline earth metal salts, which are suitable according to the invention, of perhalogenosulphonic acids are, in particular, those of the formula I $$R-SO_3-Me \qquad (I)$$

wherein R represents $C_nHal_{2n+1}$
in which
Hal is F or Cl, preferably F and
n is 1 to 8, and
Me represents $NH_4$, an alkali metal, such as, for example, lithium, sodium or potassium, or an alkaline earth metal, such as, for example, magnesium, calcium, strontium or barium.
Me is preferably potassium.

Suitable perhalogenosulphonates are the $NH_4$ or alkali metal or alkaline earth metal salts of the following perhalogenoalkanesulphonic acids: perfluoromethanesulphonic acid, perfluoroethanesulphonic acid, perfluoropropanesulphonic acid, perfluorobutanesulphonic acid, perfluoromethylbutanesulphonic acid, perfluorohexanesulphonic acid, perfluoroheptanesulphonic acid and perfluorooctanesulphonic acid, and the corresponding chloroalkanesulphonic acids.

The potassium salts of these perhalogenoalkanesulphonic acids are particularly preferred.

The polycarbonate films according to the invention should preferably have thicknesses between about [0.1] *0.01* mm and 1 mm, most preferably thicknesses between about 0.05 and 0.8 mm.

The additions, according to the invention, of perhalogenoalkanesulphonates have the effect that (a) the Oxygen Index (according to ASTM D 2863-74 and measured with a film thickness of about 0.1 mm) is $\geqq 25\%$.

(b) the flammability level (measured by the small burner test in accordance with DIN 53,438) is K 1 and F 1, (c) the flammability level (according to Test Instruction 94 of Underwriters Laboratories in the supplement of 42.7.1974) is VTF-O, in each case measured on films about 0.1 mm thick, and (d) the electrolytic corrosion (according to DIN 53,489) is A 1.

Thermoplastic aromatic polycarbonate suitable for the preparation of the polycarbonate films according to the invention may have weight-average molecular weights, $\overline{M}w$, between about 25,000 and 200,000, preferably between about 30,000 and 120,000 and in particular between about 30,000 and 80,000. $\overline{M}w$ was determined by measuring $\rho_{rel}$ in $CH_2Cl_2$ at 20° C. and a concentration of about 0.5% by weight.

Thermoplastic aromatic polycarbonates which are suitable according to the invention are, in particular, the homopolycarbonates of 2,2-bis(4-hydroxyphenyl)-propane (bisphenol A) and the copolycarbonates of bisphenol A and up to about 10 mol %, relative to molds of bisphenol A, of other diphenols and/or up to about 0.5 mol %, relative to mols of the total diphenols used, of branching components possessing at least three branching positions, for example, trisphenols or tetraphenols.

Suitable other diphenols which are suitable are bis-(hydroxyaryl)-$C_1$–$C_8$-alkanes other than bisphenol A and, in particular, bis-(hydroxyaryl)-$C_5$–$C_6$-cycloalkanes.

Suitable other diphenols are, for example, bis-(4-hydroxyphenyl)-methane (bisphenol F), 2,4-bis-(hydroxyphenyl)-2-methylbutane, 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methylbutane, 1,1-bis(4-hydroxyphenyl)-cyclohexane and 1,1-bis-(3,5-dimethyl-4-hydroxyphenyl)-cyclohexane.

Suitable branching components are, for example, phloroglucinol, 1,3,5-tris-(4-hydroxyphenyl)-benzene and 1,1,1-tris-(4-hydroxyphenyl)-ethane, 3,3-bis-(4-hydroxophenyl)-2-oxo-2,3-dihydroindole (isatin-bisphenol)-3,3-bis-(4-hydroxy-3-methylphenyl)-2-oxo-2,3-dihydroindole (isatin-bis-o-cresol), 2,2-bis-[4,4-bis-(4-hydroxyphenyl)-cyclohexyl]-propane, tetra-(4-hydroxyphenyl)-methane, tetra-(4-(4-hydroxyphenyl-isopropyl)-phenoxy)-methane and 1,4- bis-((4',4''-dihydroxy-triphenyl)-methyl)-benzene. Branching components which are preferably suitable are isatin-bisphenol, isatin-bis-o-cresol and 1,4-bis-((4',4''-dihydroxy-triphenyl)-methyl)-benzene.

Suitable polycarbonates which are preferred according to the invention are the copolycarbonates consisting of about 99–90 mol % of 2,2-bis-(4-hydroxyphenyl)-propane and about 1 to 10 mol % of 1,1-bis-(4-hydroxyphenyl)-cyclohexane.

Suitable branched polycarbonates are, in particular, those of DT-OS (German Published Specification) No. 2,254,917 (LeA 14,719), of DT-OS (German Published Specification) No., 2,500,092 (LeA 16,142), of DT-OS (German Published Specification) No. 2,113,347 (LeA 13,638) and of DT-OS (German Published Specification) No. 2,254,918 (LeA 14,711), and of U.S. Pat. Nos. 3,931,108; 3,799,953; 4,001,183 and 3,897,392, preferably those of DT-OS (German Published Specification) No. 2,500,092 (LeA 16,142) and of DT-OS (German Published Specification NO. 2,113,347 (LeA 13,638) and of U.S. Pat. Nos. 3,799,953 and 4,001,183.

The polycarbonates are prepared by processes which are known in the art, for example, according to U.S. Pat. Nos. 3,028,365 and 3,275,601, incorporated herein by reference, and branched polycarbonates are prepared by processes described according to U.S. Pat. Nos. 3,544,514 or U.S. Pat. No. Re. 27,682, incorporated herein by reference, i.e., for example, by the interfacial process.

The polycarbonates can be used either alone or as a mixture with other polycarbonates. Preferred mixtures are those of polycarbonates in the molecular weight range (weight-average) from about 25,000 to 35,000 with polycarbonates in the molecular weight range (weight-average) from about 60,000 to 80,000 or with branched polycarbonates in the molecular weight range (weight-average) from about 40,000 to 60,000.

In addition to the sulphonates which are suitable according to the invention, other, known compounds which reduce the flammability can also be added to the polycarbonate films according to the invention in amounts of up to about 10% by weight, relative to the total weight of the polycarbonate film.

Halogen-containing, low-molecular aromatic polycarbonates with average molecular weights. $\overline{M}n$ (number-average), of about 4,000 to 20,000, preferably about 8,000 to 12,000, are preferably suitable for this purpose. Such low-molecular polycarbonates are preferably prepared from 2,2-bis-(3,5-dibromo-4-hydroxyphenyl)-propane, 2,2-bis-(3-bromo-4-hydroxyphenyl)-propane, bis-(3,5-dibromo-4-hydroxyphenyl(-methane, bis-(3-bromo-4-hydroxyphenyl)-methane, 2,4-bis-(3,5-dibromo-4-hydroxyphenyl)-2-methylbutane, 2,4-bis-(3-bromo-4-hydroxyphenyl)-2-methyl-butane, 1,1- bis-(3,5-dibromo-4-hydroxyphenyl)-cyclohexane or 1,1-bis-(3-bromo-4-hydroxyphenyl)-cyclohexane. Phenol, tert.-butylphenol, p-bromophenol and 2,4,6-tribromophenol are used as chain-stoppers. Further details in this connection are described in DT-OS (German Published Specification) No. 2,354,533 and in DT-OS (German Published Specification) No. 2,243,226.

The films are manufactured either in the form of cast films by known techniques, for example, by dissolving the polycarbonate and the metal salts of the perhalogenoalkanesulphonic acids together in a suitable solvent, such as methylene chloride or 1,2-dichloroethane, and, if appropriate, adding monohydric or polyhydric alcohols, to give about 5 to 20% strength solutions which are cat in belt or drum casting machines, or by the extrusion of mixtures of the polycarbonate and the metal sulphonates in the usual three-zone single flight screws or twin-screw extruders according to the state of the art, it being possible for the shaping into films to be carried out both via slit dies to give flat films and via film blow-heads to give blown films.

The low flammability of the films was determined by the following methods:

1. Small Burner Test According to DIN 523,438

In this test, strip-shaped test pieces having the dimensions 190×90 mm×0.1 mm (edge-flaming) or 230×90 mm×0.1 mm (surface-filming) are clamped vertically in a frame and flamed with a propane gas flame 20 mm in length for 15 seconds. In the case of edge-flaming, the tip of the flame just touches the lower, exposed edge of the sample; in the case of surface-flaming, the tip of the flame touches the surface of the sample 40 mm above the lower edge of the sample. It is determined whether, and in what time, calculated from the start of flaming, the tip of the flame of the burning film reaches a marking located 150 mm above the point at which the flame is applied.

Grading into the classes K 1, K 2 and K 3 and F 1, F 2 and F 3 is carried out according to the following scheme:

| | Edge-flaming | Surface-Flaming |
|---|---|---|
| The flame does not reach the measuring mark | K 1 | F 1 |
| The tip of the flame reaches the measuring mark in 20 or more seconds | K 2 | F 2 |
| The tip of the flame reaches the measuring mark in less | K 3 | F 3 |

-continued

| | Edge-flaming | Surface-Flaming |
|---|---|---|
| than 20 seconds | | |

2. Determination of the Oxygen Index According to ASTM D 2863-74

The Oxygen Index is defined as the minimum volume concentration of oxygen in a mixture of oxygen and nitrogen at which a test piece of defined dimensions still just burns down candle-like from top to bottom. Film strips having the dimensions 140×52×0.01 mm are clamped into a U-shaped container with the longitudinal axis vertical and are ignited at the upper end with a gas flame. The Oxygen Index is that volume concentration of oxygen at which the film just burns down over a distance of 100 mm.

3. Test According to Test Instruction 94 of Underwriter's Laboratories (UL).

UL 94 has hitherto contained no data for testing films. A revised proposal for film testing as s supplement to UL 94 was published on 24.7.1974 by the body responsible for revising UL 94. According to this proposal, 5 film strips having the dimensions 203×47×0.1 mm are each wound around a mandrel having a diameter of 9.5 mm to give a roll of film 203 mm long. The rolls of film are hung vertically and ignited twice on the underside with a Bunsen burner flame, for 3 seconds each time. The length of the samples subsequently burn, and whether cottonwool below the sample is ignited by material which falls off are determined.

The following levels are proposed for the classification:

94 VTF-0

Films which neither produce burning drips nor burn up to a measuring mark located 127 mm above the flamed end of the roll of film. The maximum after-burning time may not exceed 10 seconds and the sum of the after-burning times of 10 flamings may not exceed 50 seconds.

94 VTF-1

Requirements as for level 94 VTF-0, but the maximum after-burning time may not exceed 30 seconds and the sum of the after-burning times of 10 flamings is a maximum of 250 seconds.

94 VTF-2

Requirements as for level 94 VTF-1, but produces burning drips.

If a sample burns for longer than 20 seconds, it is not possible to grade it in one of the three classes.

The determination of the electrolytic corrosion action is carried out according to DIN 53,489, the classification A 1 having the meaning "no electrolytic corrosion" both for the cathode and for the anode; the classification AN 2 having the meaning degree of corrosion 2 for the anode and degree of corrosion 6 for the cathode.

In order to measure the stress cracking, film strips 15 mm wide and 0.1 mm thick are wound spirally around a glass rod of 8 mm diameter and then stored in toluene/n-propanol mixtures for 10 seconds. After drying, the film strips are subjected to the tensile test according to DIN 53,455.

The polycarbonate films according to the invention are distinguished by a greatly reduced flammability, a low susceptibility to stress cracking, a low or non-measurable electrolytic corrosion and a high electrical resistance and, in addition to their stability compared with unsaturated polyester cast resins, they exhibit the good mechanical, dielectric and heat properties which are typical of polycarbonate films.

EXAMPLES

The examples which follow illustrate the invention. The flammability, Oxygen Index and stress cracking tests were conducted on films 0.1 mm in thickness.

EXAMPLE 1

99.5 parts of a bisphenol A polycarbonate, branched with 0.4 mol % of isatin-bisphenol, which was prepared according to DT-OS (German Published Specification) No. 2,500,092 and which has a relative viscosity of 1.42 (measured in a 0.5% strength solution in methylene chloride) and 0.5 parts of potassium perfluorobutanesulphonate were melted in a twin-screw extruder (type ZSK 53 from Werner and Pfleiderer) at 320° C. and homogenized. The extruded strand was cooled and, after being granulated, was melted in a single-screw extruder (type S 45 from Reifenhäuser) at 280° C. and shaped into a film via a 400 mm wide slit die, the extrudate being drawn over a pair of cooling rollers, heated to 90° C., at such a rate that a film with a thickness of 0.1 mm resulted.

EXAMPLE 2

Analogously to Example 1, a film was manufactured from the bisphenol A polycarbonate, branched with the isatin-bisphenol, of Example 1, 0.2% by weight of potassium perfluorobutanesulphonate and 4% by weight of tetrabromobisphenol A polycarbonate ($\overline{M}n$ about 8,000).

EXAMPLE 3

Analogously to Example 1, a film was manufactured from the bisphenol A polycarbonate, branched with the isatin-bisphenol of Example 1 and 0.5% by weight of potassium perfluoromethanesulphonate.

EXAMPLE 4

Analogously to Example 1, a film was manufactured from the bisphenol A polycarbonate, branched with isatin-bisphenol, of Example 1, and 0.6% by weight of potassium perfluorooctanesulphonate.

COMPARISON EXAMPLE A to EXAMPLES 1–4

The bisphenol A polycarbonate, branched with the isatin-bisphenol from Example 1 was extruded to give films 0.1 mm thick, by the process described in Example 1 (a) without the addition and (b) after the addition of 0.5% by weight of potassium acetate.

EXAMPLE 5

99.5 parts of a commercially available polycarbonate of bisphenol A, having a relative viscosity of 1.32, and 0.5 part of potassium perfluorobutanesulphonate were extruded to give films 0.1 mm thick by the process described in Example 1.

COMPARISON EXAMPLE B to EXAMPLE 5

The polycarbonate from Example 5 was extruded to give films 0.1 mm thick by the process described in Example 1 (a) without the addition and (b) after the addition of 0.5% by weight of potassium sulphate.

EXAMPLE 6 (COMPARISON EXAMPLE)

Analogously to Example 1, a film was manufactured from the bisphenol A polycarbonate, branched with isatin-bisphenol of Example 1 and 0.7% by weight of dipotassium eicosane-disulphonate.

EXAMPLE 7

A 15% strength solution in methylene chloride was prepared of a polycarbonate of bisphenol A which was prepared by the interfacial process and which had a relative viscosity of 1.70 (measured as a 0.5% strength solution in methylene chloride). 0.6% of potassium perfluorobutanesulphonate, relative to the polycarbonate, was added in the form of an alcoholic solution to this solution. After degassing, the solution was cast to give a film 0.1 mm thick in a drum casting machine.

COMPARISON EXAMPLE C to EXAMPLE 7

The polycarbonate from Example 7 was cast to give films 0.1 mm thick by the process described in Example 7 (a) without the addition and (b) after the addition of 0.5% by weight of potassium acetate.

The table which follows contains the measured values.

| Example | 1 | 2 | 3 | 4 | Comparison Example A | | 5 | Comparison Example B | | 6 | 7 | Comparison Example C | |
|---|---|---|---|---|---|---|---|---|---|---|---|---|---|
| Metal sulphonate type[1] | A | A | B | C | — | KAc | A | — | $K_2SO_4$ | D | A | — | KAc |
| % by weight | 0.5 | 0.2 | 0.5 | 0.6 | — | 0.5 | 0.5 | — | 0.5 | 0.7 | 0.6 | — | 0.5 |
| Tetrabromobisphenol polycarbonate $M_n$ = about 8,000 % by weight | — | 4 | — | — | — | | — | — | — | — | — | — | — |
| Oxygen index at 0.1 mm thickness (ASTM D 2,863-74)°C. | 25 | 26 | 26 | 25 | 21 | 21 | 25 | 21 | 21 | 25 | 26 | 21 | 21 |
| Small burner test at 0.1 mm thickness (DIN 53,438) | K1/ F1 | K1/ F1 | K1/ F1 | K1/ F1 | K3/ F3 | K3/ F3 | K1 F1 | K3/ F3 | K3/ F3 | K1/ F1 | K1/ F1 | K3/ F3 | K3/ F3 |
| UL Subj. 94, VTF | 0 | 0 | 0 | 0 | >30 seconds | >30 seconds | 0 | >30 seconds | >30 seconds | 0 | 0 | >30 seconds | >30 seconds |
| Tensile strength (DIN 53,455) MPa | 82 | 80 | 85 | 88 | 88 | 82 | 87 | 88 | 83 | 90 | >100 | >100 | >100 |
| Elongation at break (DIN 53,455)% | 95 | 92 | 98 | 91 | 95 | 93 | >100 | >100 | >100 | 90 | >100 | >100 | >100 |
| Elongation at break (%) after 10 seconds storage in toluene/n-propanol 1:3.5 | 55 | 56 | 60 | 54 | 22 | 15 | 35 | 10 | 8 | 35 | >100 | >100 | 50 |
| Dielectric constant (20° C./50 Hz) (DIN 53,483) | 3.2 | 3.1 | 3.2 | 3.2 | 3.1 | 3.2 | 3.2 | 3.1 | 3.2 | 3.2 | 3.2 | 2.9 | 3.0 |
| Dielectric loss factor tan. $\gamma \cdot 10^4$ (20° C./50 Hz) (DIN 53,483) | 12.7 | 17 | 15 | 19 | 14 | 19 | 25 | 23 | 24 | 22 | 32 | 30 | 31 |
| Volume resistivity $\Omega \cdot$ cm (DIN 53,482) | $2 \cdot 10^{16}$ | $10^{16}$ | $10^{16}$ | $2 \cdot 10^{16}$ | $2 \cdot 10^{16}$ | $10^{16}$ | $10^{17}$ | $10^{17}$ | $9 \cdot 10^{16}$ | $2 \cdot 10^{16}$ | $2 \cdot 10^{16}$ | $2 \cdot 10^{16}$ | $2 \cdot 10^{16}$ |
| Electrolytic corrosion (DIN 53,489) | A 1 | A 1 | A 1 | A 1 | A 1 | AN2 | A 1 | A 1 | AN2 | A 1 | A 1 | A 1 | AN2 |
| Stability to heat °C. (VDE 0345 ξ 25)[2] | 153 | 152 | 154 | 154 | 154 | 153 | 154 | 155 | 154 | 153 | 154 | 154 | 153 |

[1]Metal sulphonate type:
A = potassium perfluorobutanesulphonate
B = potassium perfluoromethanesulphonate
C = potassium perfluorooctanesulphonate
D = dipotassium eicosane-disulphonate
KAc = potassium acetate

[2]VDE 0345 ξ 25 defines the stability of films at tension during thermal conditions. The influence of increase of temperature on a film which is under constant mechanical tension is measured. The temperature is indicated at which the length of the film has been elongated for 40% or at which the film has been teared.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. [Polycarbonate films,] *A glass fiber-free polycarbonate film having a thickness of about 0.01 mm to 1 mm comprising an aromatic linear polycarbonate resin* characterized in that [they contain] *it contains* about 0.01% by weight to 2% by weight of a $NH_4$ salt, alkali metal salt or alkaline earth metal salt of a perhalogenoalkanesulphonic acid.

2. Polycarbonate films according to claim 1, characterized in that they contain between about 0.01% by weight and 2% by weight of a $NH_4$ salt, alkali metal salt or alkaline earth metal salt of a perfluoroalkanesulphonic acid.

3. Polycarbonate extruded films according to claim 1.

4. Polycarbonate films according to claim 1, characterized in that they contain $NH_4$ salts, alkali metal salts or alkaline earth metal salts of perhalogenosulphonic acids of the formula I $$R—SO_3—Me \quad (I)$$

wherein R represents $C_nHal_{2n+1}$ *in which*

Hal is F or Cl and n is 1 to 8, and wherein Me is $NH_4$, an alkali metal or an alkaline earth metal.

5. Polycarbonate films according to claim 4, characterized in that Me is potassium.

6. Polycarbonate films according to claim 1, characterized in that the films additionally contain up to about 10% by weight of low-molecular weight, halogen-containing aromatic polycarbonates having average molecular weights $\overline{M}n$ of about 4,000 to 20,000.

7. Polycarbonate films according to claim 6, characterized in that the low-molecular weight, halogen-containing polycarbonate used is one based on tetrabromobisphenol A.

8. Polycarbonate films according to claim 1, characterized in that the polycarbonates used are high molecular weight, aromatic copolycarbonates of about 99–90 mol % of bisphenol A and about 1–10 mol % of 1,1-bis-(4-hydroxyphenyl)-cyclohexane having average molecular weight $\overline{M}_w$, of about 30,000 to 120,000.

[9. Polycarbonate films according to claim 8, characterized in that the high molecular weight polycarbonates are branched with up to about 0.5 mol %, relative to bisphenol A, of branching components with at least three branching positions.]

10. Polycarbonate films according to claim 1 characterized in that mixtures of high-molecular weight polycarbonates having weight average molecular weights, $\overline{M}_w$, of from about 25,000 to 80,000 are used.

11. A *glass fiber-free* polycarbonate film *having a thickness of 0.01 to 1 mm* consisting essentially of [an] *a linear* aromatic polycarbonate having a weight-average molecular weight, $\overline{M}_w$, of between about 25,000 and 200,000 and about 0.1 to 2% by weight of a perhalogenoalkanesulphonic acid salt selected from the group consisting of a $NH_4$ salt, an alkali metal salt and an alkaline earth metal salt.

12. The polycarbonate film of claim 11 wherein the perhalogenoalkanesulphonic acid salt is of the formula $$R—SO_2—Me$$

wherein R represents $C_nHal_{2n+1}$ wherein

Hal is F or Cl and n is 1 to 8, and

Me is $NH_4$, an alkali metal or an alkaline earth metal.

13. The polycarbonate film of claim 12 wherein the perhalogenoalkanesulphonic acid salt is a perfluoroalkanesulphonic acid salt.

14. A *glass fiber-free* polycarbonate film *having a thickness of about 0.01 to 1 mm* consisting essentially of [an] *a linear* aromatic polycarbonate having a weight-average molecular weight, $\overline{M}_w$, of between about 25,000 and 200,000 up to about 10% by weight of a low-molecular weight, halogen-containing aromatic polycarbonate having a number-average molecular weight, Mn, of about 4,000 to 20,000 and about 0.1 to 2% by weight of perhalogenoalkanesulphonic acid salt selected from the group consisting of a $NH_4$ salt, an alkali metal salt and an alkaline earth metal salt.

15. A glass fiber-free polycarbonate film *having a thickness of about 0.01 to 1 mm* comprising [an] *a linear* aromatic polycarbonate having a weight-average molecular weight, $\overline{M}_w$, of between about 25,000 and 200,000 and about 0.1 to 2% by weight of *a* perhalogenoalkanesulphonic acid salt selected from the group consisting of a $NH_4$ salt, an alkali metal salt and an alkaline earth metal salt.

16. A process for improving the stress crack resistance of a polycarbonate film *based on a linear resin* comprising incorporating from about 0.01 to 2% by weight of *a* perhalogenoalkanesulphonic acid salt selected from the group consisting of [an] *a* $NH_4$ salt, an alkali metal salt and an alkaline earth metal salt into said polycarbonate film.

17. The process of claim 16 wherein the perhalogenoalkanesulphonic acid salt is of the formula $$R—SO_3—Me$$

wherein R represents $C_nHal_{2n+1}$ wherein

Hal is F or Cl, and, n is 1 to 8 and, wherein Me is $NH_4$, an alkali metal or an alkaline earth metal.

18. A polycarbonate film *having a thickness of about 0.012 to 1 mm* consisting of [an] *a linear* aromatic polycarbonate having a weight average molecular weight, $\overline{M}_w$, of between about 25,000 and 200,000 and about 0.1 to 2% by weight of a perhalogenoalkanesulphonic acid salt selected from the group consisting of [an] *a* $NH_4$ salt, an alkali metal salt and an alkaline earth metal salt.

*19. A glass fiber-free polycarbonate film having a thickness of about 0.05 mm to 0.8 mm comprising an aromatic linear polycarbonate resin characterized in that it contains about 0.01 to 2 percent by weight of a* $NH_4$ salt, alkali metal salt or alkaline earth metal salt of a perhalogenoalkylsulphonic acid.

* * * * *